Nov. 11, 1947.    W. BROWN    2,430,705
CYCLE WHEEL HUB
Filed Oct. 23, 1945
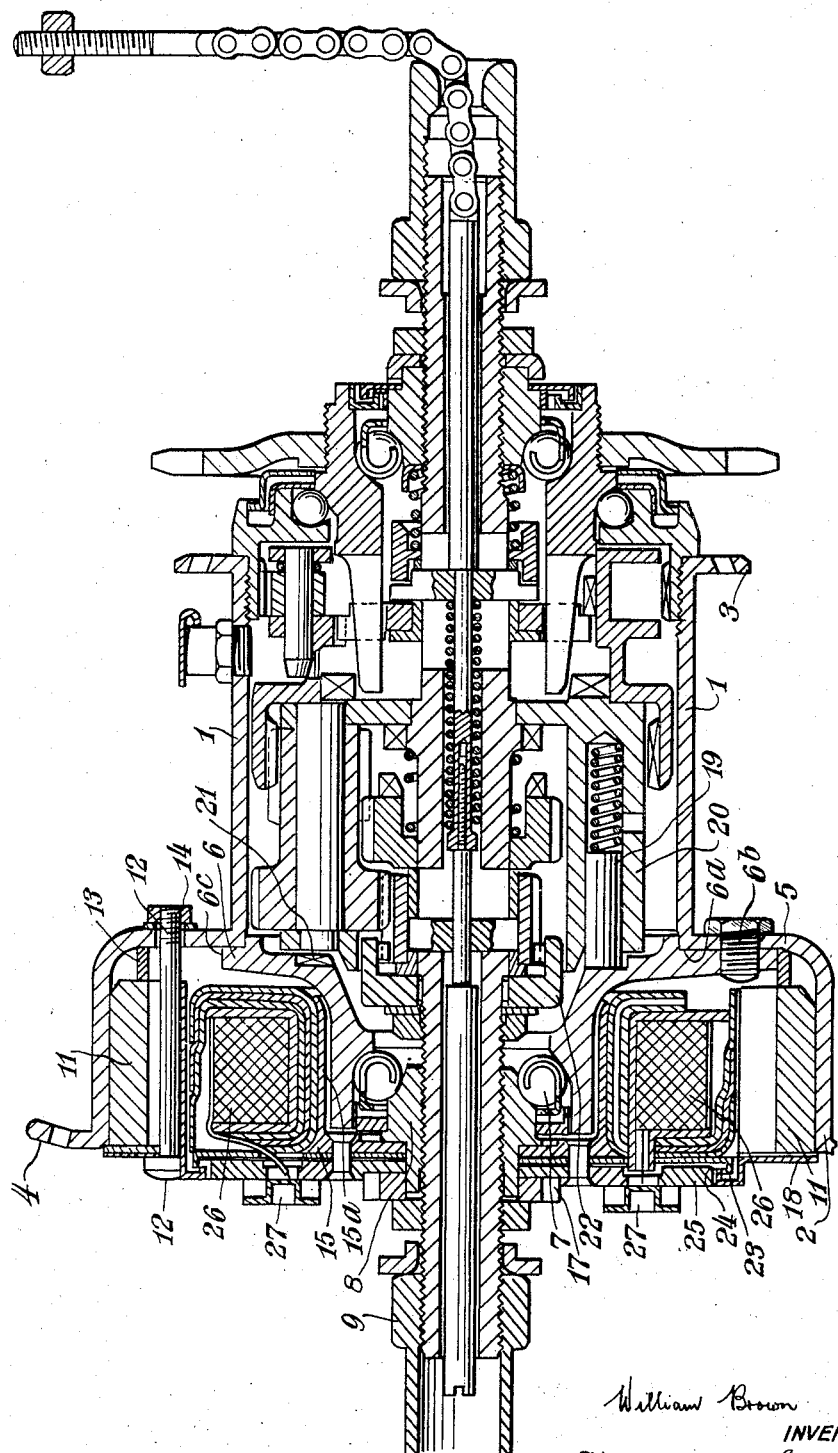
William Brown
INVENTOR.
BY Walter Gunn
ATTORNEY.

UNITED STATES PATENT OFFICE 2,430,705

CYCLE WHEEL HUB

William Brown, Nottingham, England

Application October 23, 1945, Serial No. 623,938
In Great Britain October 28, 1944

6 Claims. (Cl. 171—209)

This invention relates to wheel hubs. It has been proposed at different times to house within a cycle wheel hub some one or other component such as a variable speed gear, an internal expanding brake or a coaster brake, or an electric dynamo or alternator. In some cases two such components have been enclosed in a single hub, for instance a variable speed gear and a coaster brake have been combined, and an internal expanding brake has been combined with a variable speed gear in a single hub, but it has not hitherto been proposed to house a variable speed gear and an electric generator or alternator in one and the same hub shell, and the present invention is based on an appreciation of novel constructional advantages to be obtained from such combination.

Variable speed gear hubs must perforce be in the rear wheel hub. For some purposes, e. g., in an electrically-equipped bicycle it is also more convenient to have the electric generator in the rear wheel hub, and it is the object of this invention to combine these two components in an efficient and satisfactory manner whilst providing hitherto novel and unforeseen advantages.

According to this invention the combination of a hub dynamo and hub gear for a cycle is characterised in that the dynamo and gear are combined in the same hub for the purpose of reducing the total weight of a cycle embodying such combination.

According to a preferred embodiment of this invention, a combined wheel hub dynamo and hub gear comprises a one piece wheel hub shell of relatively large diameter, and a variable speed gear therein, said shell having integral spoke-receiving flanges at its ends, and being formed at one end with a cylindrical magnet housing, a multi-polar ring magnet mounted therein, a shoulder in the hub shell at the formation of the magnet housing, a bearing member for the shell located at the said shoulder and extending laterally into the centre of the magnet housing, a stationary complementary bearing member projecting into the centre of the bearing housing and a stator, complementary to the magnet, located on said stationary bearing member.

An electric generator having a stationary armature and a rotating ring magnet, without intermediate gearing requires a magnet (and therefore an enclosing housing) of a given minimum diameter at least, which is a diameter greater than that required for an epicyclic variable speed gear. On the other hand, a variable speed gear, to give three or more speeds, requires a hub of a certain length, which is usually the maximum length allowable between the stays of the bicycle frame.

According to a further feature of this invention the projecting end cover of a speed gear hub is caused to telescope into the stationary armature of a generator, those parts being shaped to nest together, but with a slight clearance to allow relative rotation, and the one piece hub shell is made to a larger diameter growing from the part which receives that end cover, to receive and house a ring magnet of adequate size for the armature. The said projecting end cover of the speed gear hub will include the usual supporting bearing, and the outer race or cone of that bearing will be extended and formed with a shoulder to receive and hold a cup-shaped carrier for the stationary armature, such carrier having its flange directed inwardly over the projecting end cover.

In a convenient embodiment of the invention the usual flat faces on the projecting end cover of the gear are removed, and the cup-shaped flange of the armature carrier is enlarged at the rim, those two parts mating with each other, but with a slight clearance and to compensate for the loss of the said flat faces, means is provided on the interior of the cover for use in screwing it tightly into the hub shell. For example there may be a projecting rim or flange around the interior orifice of the cover, with transverse slots in it to receive a key.

In the accompanying drawing one example of the improved hub is illustrated. As shown, the figure is a vertical longitudinal section through the hub.

The one piece hub shell is of two diameters, having the smaller but longer part 1, and the larger but shorter part 2, these being flanged at the outer ends 3 and 4 respectively to receive the wheel spokes (not shown) and having a vertical wall 5 joining them together at their inner ends. In the inner end of the longer part 1, is secured the end component 6 of a variable speed gear, being a combined end cap and bearing member, this being designed so as to be located at the large diameter shoulder 6a. The part 6 may screw into the hub part 1 or as shown be secured by bolts 6b or rivets through the wall 5. The wall 5 may, if desired, be sloped instead of vertical. The part 1 of the hub encloses a variable speed gear mechanism, which may be of any form. The hub is supported by the end component 6 in usual manner by means of the anti-friction balls 7 and the fixed cone 8 on spindle 9.

The end component 6 is made with a smooth outer surface of uniform cross section in all axial planes, and where it is constructed to screw into the longer hub part, in order that it may be gripped adequately for tight screwing, it is formed with an internal flange, in which slots may be cut, or which may be of suitable shape, to receive a key. This construction necessitates that in assembling the hub the end component 6 must be secured in place first, and not last as is generally the case now.

Secured within the larger part 2 of the hub is a ring magnet 11, this being held in place by bolts 12, against a peripheral packing ring 13, the wall 5 (if sloped) being shaped to receive the nuts 14 on the bolts. This magnet rotates with the hub.

The fixed cone 8 carries the cup-shaped support 15 for the armature 16, this having laminated tegulated pole faces. This cup-shaped support 15 is turned outwardly at the free end 15a so as to follow the contour of the end component 6, but a slight clearance is left between the support, and that component, to avoid contact during rotation. The support is held in place by the nut 17, and a dust cover 18 held in place by the magnet bolts 12, encloses the armature.

The gear portion of the hub follows the general lines of a four-speed gear. The combined ball race and end member 6 is spigotted as above described into the shell 1 on a shallower large diameter spigot, and secured to the shell by means of screws 6b. This permits of the shell being shorter between the small diameter flange and the back wall of the drum, by deleting the original pawl mechanism and substituting the plunger type pawls 19 which are inserted in holes drilled in the planet cage body 20 in the struts between the portions milled out to receive the double planet pinions. These pawls 19 co-act with a spirally cut face ratchet 21 in the end member 6. Since it is not now possible to have the planet cage taking a bearing on the end member 6, this support bearing has been transferred to the dog ring 22. The end member 6 is of sufficiently large diameter to take the fixing screws 6b, but is flatted in four places as shown at 6c to allow passage for the magnet fixing screws 5.

As regards the armature end plate construction of the generator, this consists of a thin metal plate 23, which forms part of the water excluding labyrinth. Then comes a thin fibre washer 24 and the end plate proper 25. The two ends of the winding 26 are brought out to the spring clips 27, which take the place of the original terminals. The armature core is of laminated imbricated construction, the tegulated pole pieces being stepped. The magnet is spaced in the drum to suit the armature position by the ring 13 and is held in the usual way by the screws 12 as previously described. The telescoped arrangement of the gear and dynamo is very clearly shown, and has the advantage of permitting the ball race 7 to be placed in its best relationship to the armature.

A major advantage of the construction of the invention, but one which is indirect and therefore not obvious, is the possibility of saving weight in a bicycle as a whole. Assuming that a cycle is required embodying both a change speed gear and a hub dynamo it has hitherto been necessary to locate the dynamo at the front wheel hub as the rear wheel hub is necessarily earmarked to house the gear. To house the dynamo in the front wheel hub requires more metal than to house it with the gear because of the relatively small initial diameter of the front wheel hub, such further metal being required whether the hub itself is to be enlarged or to form the magnet housing. Consequently, there is at least 10 ounces in weight difference between the joint weight of a front hub with dynamo and a rear wheel hub gear compared with the joint weight of a normal front wheel hub and the hub dynamo and gear in the one hub shell according to this invention. Such difference though numerically small is of considerable importance in the design and construction of a cycle.

It will be observed that the one-piece construction of the shell, combined with the relatively large diameter of the locating shoulder 6a for the combined end cap and bearing member, enables the ring magnet 11 to be housed with a higher degree of concentricity relative to the bearings of the hub shell, whilst the stiffer construction provided by the larger diameter of the longer part 1 of the shell (larger compared with the normal hub shell for a front wheel or rear wheel without a hub gear), also reduces risk of distortion. Consequently, the air gap at the pole faces between the magnet and stator can be reduced and such reduction, though small, has as is known a disproportionately important bearing on the electrical efficiency of the dynamo and the appreciation of the possibility of such reduction is an important factor in the conception of this invention.

It will also be observed that by nesting the armature core and the end component 6 together, the maximum length of pole face is obtainable, whilst there is no cramping of the space required for the speed gear mechanism.

What I claim is:

1. A combined wheel hub dynamo and hub gear for a cycle comprising a hub-shell having means at its ends for receiving the inner ends of wheel spokes, said hub-shell having a larger diameter part on one side than the other, change speed gear mechanism in the smaller diameter part, an end component of said mechanism secured at the junction of said parts and extending into the center portion of said larger part, a spindle for said hub, a bearing interposed between said spindle and said end component, a rotatable ring magnet secured at the inner face of said larger part, a fixed armature mounted in the annular space between said magnet and said end component and an armature support secured on said spindle.

2. A combined wheel hub dynamo and hub gear for a cycle comprising a hub-shell having means at its ends for receiving the inner ends of wheel spokes, said hub-shell having a larger diameter part on one side than the other, change speed gear mechanism in the smaller diameter part, an end component of said mechanism secured at the junction of said parts and extending into the center portion of said larger part, a ratchet in said end component at the face thereof adjacent said mechanism and a spring-actuated pawl in said mechanism contacting with said ratchet, a spindle for said hub, a bearing interposed between said spindle and said end component, a rotatable ring magnet secured at the inner face of said larger part, a fixed armature mounted in the annular space between said magnet and said end component and an armature support secured on said spindle.

3. A combined wheel hub dynamo and hub gear for a cycle comprising a hub-shell having means at its ends for receiving the inner ends of wheel spokes, said hub-shell having a larger diameter part on one side than the other, change speed gear mechanism in the smaller diameter part, an end component of said mechanism secured at the junction of said parts and extending into the center portion of said larger part, a spindle for said hub, a bearing interposed between said spindle and said end component, a rotatable ring magnet secured at the inner face of said larger part, a fixed armature mounted in the annular space between said magnet and said end component and an armature support secured on said spindle, and a plurality of plates carried by said support constituting a water-excluding labyrinth for said armature.

4. A combined wheel hub dynamo and hub gear for a cycle comprising a hub-shell having means at its ends for receiving the inner ends of wheel spokes, said hub-shell having a larger diameter part on one side than the other, change speed gear mechanism in the smaller diameter part, an end component of said mechanism secured at the junction of said parts and extending into the center portion of said larger part, a spindle for said hub, a bearing interposed between said spindle and said end component, a rotatable ring magnet secured at the inner face of said larger part, a fixed armature mounted in the annular space between said magnet and said end component and an armature support secured on said spindle, the free end of said larger part being open, a cover for the same, said cover, armature support and armature being in a single removable unit.

5. A combined wheel hub dynamo and variable speed transmission gear for a cycle consisting of a one-piece wheel hub-shell having integral spoke receiving flanges at its ends and being formed at one end with a cylindrical magnet housing of larger diameter and at the other end with a cylindrical gear housing of smaller diameter, the junction of the two housings providing a shoulder, there being mounted within the magnet housing so as to rotate at wheel speed a multi-polar annular permanent magnet and concentric therewith a multi-polar annular armature fixed in relation to the wheel spindle, there being mounted within the gear housing a variable speed transmission gear, the inner end member whereof is fixed to the said shoulder and is shaped to nest within the said armature and to constitute the rotatable end bearing housing of the hub.

6. A combined wheel hub dynamo and variable speed transmission gear for a cycle consisting of a one-piece wheel hub shell having integral spoke receiving flanges at its ends and being formed at one end with a cylindrical magnet housing of larger diameter and at the other end with a cylindrical gear housing of smaller diameter, the junction of the two housings providing a shoulder, there being mounted within the magnet housing so as to rotate at wheel speed a multi-polar annular permanent magnet and concentric therewith a multi-polar annular armature fixed in relation to the wheel spindle, there being mounted within the gear housing a variable speed transmission gear of the type herein defined, the inner end member whereof is fixed to the said shoulder and is shaped to nest within the said armature and to constitute the rotatable end bearing housing of the hub, and has formed on its interior face and constituting part of one of the alternative ratchet and pawl drives of the said gear a face ratchet adapted to co-act with axially spring-actuated plunger pawls located in axial holes formed in the face of the adjacent planet cage.

WILLIAM BROWN.

REFERENCES CITED

The following references are of record in the file of this patent:

UNITED STATES PATENTS

| Number | Name | Date |
|---|---|---|
| 2,256,794 | Schwab | Sept. 23, 1941 |

FOREIGN PATENTS

| Number | Country | Date |
|---|---|---|
| 502,285 | England | Mar. 15, 1939 |